(12) United States Patent
Bergman et al.

(10) Patent No.: US 12,297,775 B2
(45) Date of Patent: May 13, 2025

(54) AIRCRAFT HEAT EXCHANGER PANEL ARRAY INTERCONNECTION

(71) Applicant: Raytheon Technologies Corporation, Farmington, CT (US)

(72) Inventors: Russell J. Bergman, South Windsor, CT (US); William D. Blickenstaff, Port Saint Lucie, FL (US); James F. Wiedenhoefer, Windsor, CT (US); William P. Stillman, Boulder, CO (US); Patrick M. Hart, Enfield, CT (US); Scott D. Virkler, Ellington, CT (US)

(73) Assignee: RTX Corporation, Farmington, CT (US)

( * ) Notice: Subject to any disclaimer, the term of this patent is extended or adjusted under 35 U.S.C. 154(b) by 571 days.

(21) Appl. No.: 17/125,214

(22) Filed: Dec. 17, 2020

(65) Prior Publication Data

US 2021/0207535 A1 Jul. 8, 2021

Related U.S. Application Data

(60) Provisional application No. 62/971,446, filed on Feb. 7, 2020, provisional application No. 62/957,091, filed on Jan. 3, 2020.

(51) Int. Cl.
*F02C 7/141* (2006.01)
*F02C 7/18* (2006.01)
(Continued)

(52) U.S. Cl.
CPC .............. *F02C 7/18* (2013.01); *F02C 7/141* (2013.01); *F28F 9/0221* (2013.01);
(Continued)

(58) Field of Classification Search
CPC ........ F28F 9/0131; F28F 9/185; F28F 9/0253; F28F 9/251; F28D 1/035
See application file for complete search history.

(56) References Cited

U.S. PATENT DOCUMENTS 4,137,705 A * 2/1979 Andersen .............. F28D 9/0025
60/728
4,438,809 A 3/1984 Papis
(Continued)

FOREIGN PATENT DOCUMENTS

CN 108869044 A 11/2018
CN 208368689 U * 1/2019 ......... F28D 1/05366
(Continued)

OTHER PUBLICATIONS

Translation of French Document FR2770632A1 entitled Translation—FR2770632A1 (Year: 2023).*
(Continued)

*Primary Examiner* — Paul Alvare
(74) *Attorney, Agent, or Firm* — Bachman & LaPointe, P.C.

(57) ABSTRACT

A heat exchanger for providing thermal energy transfer between first and second flows along first and second flowpaths has a plate bank having a plurality of plates. Each plate has: opposite first and second faces and leading and trailing edges along the second flowpath; a proximal edge having along the first flowpath: at least one inlet port; at least one outlet port; and at least one passageway. An inlet manifold has at least one inlet port and at least one outlet port. An outlet manifold has at least one outlet port and at least one inlet port. The first flowpath passes from the at least one inlet port of the inlet manifold, through the at least one passageway of each of the plurality of plates, and through the at least one outlet port of the outlet manifold. A shroud links distal portions of the plates.

21 Claims, 14 Drawing Sheets

(51) Int. Cl.
    *F28D 1/03*     (2006.01)
    *F28F 9/013*    (2006.01)
    *F28F 9/02*     (2006.01)

(52) U.S. Cl.
    CPC ........ *F28F 9/0278* (2013.01); *F05D 2240/91* (2013.01); *F05D 2250/314* (2013.01); *F05D 2260/213* (2013.01); *F05D 2260/60* (2013.01); *F28D 1/035* (2013.01); *F28F 9/0131* (2013.01); *F28F 9/0251* (2013.01); *F28F 9/0253* (2013.01); *F28F 2009/0292* (2013.01)

(56) References Cited

U.S. PATENT DOCUMENTS

| | | | |
|---|---|---|---|
| 4,520,868 A | 6/1985 | Grawey | |
| 4,813,112 A * | 3/1989 | Pilliez | F28F 9/185 |
| | | | 29/515 |
| 5,318,114 A * | 6/1994 | Sasaki | F28F 9/0204 |
| | | | 165/177 |
| 5,417,280 A * | 5/1995 | Hayashi | F25B 39/022 |
| | | | 165/153 |
| 5,443,116 A * | 8/1995 | Hayashi | F25B 39/022 |
| | | | 165/149 |
| 5,517,757 A * | 5/1996 | Hayashi | B60H 1/3227 |
| | | | 29/890.039 |
| 5,531,268 A | 7/1996 | Hoshino et al. | |
| 5,647,742 A * | 7/1997 | Sears | F28F 9/0075 |
| | | | 432/247 |
| 6,006,741 A * | 12/1999 | Daddis, Jr. | F24H 3/087 |
| | | | 165/177 |
| 6,134,880 A | 10/2000 | Yoshinaka | |
| 6,328,100 B1 * | 12/2001 | Haussmann | F28F 9/0202 |
| | | | 165/140 |
| 6,430,931 B1 | 8/2002 | Horner | |
| 6,564,863 B1 * | 5/2003 | Martins | F28F 9/185 |
| | | | 165/173 |
| 6,607,026 B1 | 8/2003 | Naji et al. | |
| 6,945,320 B2 * | 9/2005 | Harvard, Jr. | F24H 3/087 |
| | | | 165/177 |
| 7,334,411 B2 | 2/2008 | Vandermolen | |
| 7,669,645 B2 * | 3/2010 | Nakamura | F28D 9/0025 |
| | | | 165/157 |
| 7,784,528 B2 | 8/2010 | Ottow et al. | |
| 7,861,512 B2 | 1/2011 | Olver et al. | |
| 8,181,443 B2 | 5/2012 | Rago | |
| 8,266,888 B2 | 9/2012 | Liu | |
| 8,387,362 B2 | 3/2013 | Storage et al. | |
| 8,438,835 B2 | 5/2013 | Perveiler et al. | |
| 8,573,291 B2 | 11/2013 | Vick | |
| 8,656,988 B1 * | 2/2014 | Paul | F28D 1/05366 |
| | | | 165/906 |
| 8,689,547 B2 | 4/2014 | Burgers et al. | |
| 8,770,269 B2 | 7/2014 | Scott | |
| 8,784,047 B2 | 7/2014 | Elder | |
| 9,200,855 B2 | 12/2015 | Kington et al. | |
| 9,243,563 B2 | 1/2016 | Lo | |
| 9,328,968 B2 | 5/2016 | Vanderwees | |
| 9,377,250 B2 | 6/2016 | Landre | |
| 9,395,122 B2 * | 7/2016 | Eleftheriou | F28F 13/08 |
| 9,732,702 B2 | 8/2017 | Ueda | |
| 9,766,019 B2 | 9/2017 | Eleftheriou et al. | |
| 9,771,867 B2 | 9/2017 | Karam et al. | |
| 9,816,766 B2 | 11/2017 | Miller et al. | |
| 9,835,043 B2 | 12/2017 | Kantany et al. | |
| 9,851,159 B2 | 12/2017 | Cameron | |
| 9,909,812 B2 | 3/2018 | Peskos et al. | |
| 9,982,630 B2 | 5/2018 | Marini et al. | |
| 10,041,741 B2 | 8/2018 | Turcotte et al. | |
| 10,100,740 B2 | 10/2018 | Thomas | |
| 10,125,684 B2 | 11/2018 | Yu | |
| 10,175,003 B2 | 1/2019 | Sennoun et al. | |
| 10,184,400 B2 | 1/2019 | Cerny et al. | |
| 10,208,621 B2 | 2/2019 | Hoefler et al. | |
| 10,222,142 B2 | 3/2019 | Alvarez et al. | |
| 10,316,750 B2 | 6/2019 | Loebig et al. | |
| 10,422,585 B2 | 9/2019 | Jensen et al. | |
| 10,480,407 B2 | 11/2019 | Alecu | |
| 10,830,540 B2 * | 11/2020 | Sennoun | B33Y 80/00 |
| 2001/0018024 A1 * | 8/2001 | Hyde | F01D 5/187 |
| | | | 416/96 A |
| 2004/0026072 A1 | 2/2004 | Yi et al. | |
| 2004/0050531 A1 * | 3/2004 | Horiuchi | F28D 1/0375 |
| | | | 165/41 |
| 2004/0111829 A1 | 6/2004 | Bruno et al. | |
| 2009/0169359 A1 | 7/2009 | Murphy et al. | |
| 2010/0084120 A1 | 4/2010 | Yin et al. | |
| 2010/0170262 A1 | 7/2010 | Kaslusky et al. | |
| 2011/0088405 A1 | 4/2011 | Turco | |
| 2011/0146944 A1 | 6/2011 | Hand et al. | |
| 2011/0168366 A1 | 7/2011 | Garret et al. | |
| 2013/0199152 A1 | 8/2013 | Menheere et al. | |
| 2014/0246179 A1 | 9/2014 | Vallee et al. | |
| 2014/0318751 A1 * | 10/2014 | Kinder | F28F 1/128 |
| | | | 165/151 |
| 2015/0047818 A1 | 2/2015 | Peskos et al. | |
| 2015/0047820 A1 | 2/2015 | Rhoden | |
| 2016/0069266 A1 | 3/2016 | Murphy et al. | |
| 2016/0123230 A1 | 5/2016 | Thomas | |
| 2016/0177828 A1 | 6/2016 | Snyder et al. | |
| 2016/0230669 A1 | 8/2016 | Selstad et al. | |
| 2016/0265850 A1 * | 9/2016 | Kupiszewski | F28D 1/0233 |
| 2016/0362999 A1 | 12/2016 | Ho | |
| 2017/0009703 A1 | 1/2017 | Moon et al. | |
| 2017/0184024 A1 | 6/2017 | Sennoun | |
| 2017/0363361 A1 | 12/2017 | Turney | |
| 2018/0051935 A1 | 2/2018 | Roberge | |
| 2018/0058472 A1 | 3/2018 | Tajiri et al. | |
| 2018/0172368 A1 | 6/2018 | Kowalski et al. | |
| 2018/0238238 A1 | 8/2018 | Luschek et al. | |
| 2018/0238630 A1 | 8/2018 | Pollard et al. | |
| 2018/0244127 A1 | 8/2018 | Sennoun et al. | |
| 2018/0245853 A1 | 8/2018 | Sennoun et al. | |
| 2018/0258859 A1 | 9/2018 | Suciu et al. | |
| 2018/0292140 A1 | 10/2018 | Mayo et al. | |
| 2018/0328285 A1 | 11/2018 | Tajiri et al. | |
| 2019/0154345 A1 | 5/2019 | Martinez et al. | |
| 2019/0170445 A1 | 6/2019 | McCaffrey | |
| 2019/0170455 A1 | 6/2019 | McCaffrey | |
| 2019/0204012 A1 | 7/2019 | Army et al. | |
| 2019/0212074 A1 | 7/2019 | Lockwood et al. | |
| 2019/0234690 A1 | 8/2019 | Sobolak et al. | |
| 2019/0277571 A1 | 9/2019 | Disori et al. | |
| 2019/0277579 A1 | 9/2019 | Disori et al. | |
| 2019/0293365 A1 | 9/2019 | Disori et al. | |
| 2019/0310030 A1 | 10/2019 | Pisori et al. | |
| 2019/0339012 A1 | 11/2019 | Disori et al. | |
| 2020/0347737 A1 | 11/2020 | Bordoni | |
| 2021/0222624 A1 | 7/2021 | Wiedenhoefer et al. | |
| 2021/0222962 A1 | 7/2021 | Wiedenhoefer et al. | |
| 2021/0222963 A1 | 7/2021 | Bergman et al. | |
| 2021/0285375 A1 * | 9/2021 | Wiedenhoefer | F02C 7/18 |
| 2021/0318071 A1 | 10/2021 | Hart et al. | |

FOREIGN PATENT DOCUMENTS

| | | | | |
|---|---|---|---|---|
| CN | 110553533 A | * | 12/2019 | F28F 11/00 |
| DE | 9309822 U1 | * | 7/1994 | |
| DE | 19515528 A1 | * | 10/1996 | F28D 1/035 |
| DE | 102008051422 A1 | * | 4/2010 | F02B 29/0462 |
| EP | 91873 A | * | 10/1983 | F28F 9/182 |
| EP | 656517 A1 | * | 6/1995 | B60H 1/00328 |
| FR | 2770632 A1 | * | 5/1999 | F28D 1/0391 |
| FR | 3075870 A1 | | 6/2019 | |
| GB | 574450 A | * | 2/1942 | |
| JP | 10961084 A | | 3/1997 | |
| WO | WO-2007048889 A1 | * | 5/2007 | F28D 1/05383 |
| WO | WO-2014172788 A1 | * | 10/2014 | F28D 1/05366 |
| WO | 2021/138307 A1 | | 7/2021 | |
| WO | 2021/146674 A1 | | 7/2021 | |

(56) References Cited

OTHER PUBLICATIONS

European Search Report and Opinion dated Oct. 20, 2021 for European Patent Application No. 20218011.3.
International Search Report and Written Opinion dated Mar. 31, 2021 for PCT/US21/13804.
European Search Report dated Feb. 7, 2022 for European Patent Application No. 21740964.8 (EP stage of PCT/US2021/013804-WO/2021/146674).
U.S. Office Action dated Dec. 13, 2021 for U.S. Appl. No. 17/124,551.
U.S. Office Action dated Nov. 9, 2021 for U.S. Appl. No. 17/139,174.
International Search Report and Written Opinion dated Mar. 19, 2021 for PCT/US20/67289.
European Search Report dated Nov. 25, 2021 for European Patent Application No. 20910078.3 (EP stage of PCT/US2020/067289-WO/2021/138307).
European Search Report dated Nov. 19, 2021 for European Patent Application No. 21191780.2 (divisional of EP stage of PCT/US2020/067289-WO/2021/138307).
Chris Wiegand et al., "F-35 Air Vehicle Technology Overview", Aviation Technology, Integration, and Operations Conference, Jun. 2018, American Institute of Aeronautics and Astronautics, Inc., Reston, Virginia.
Jonathan Lowell, "Keeping Cool over Salt Lake", Aug. 25, 2019, US Air Force, Washington, DC, retrieved from Internet Nov. 9, 2019 https://www.af.mil/News/Commentaries/Display/Article/1941943/keeping-cool-over-salt-lake/.
Sean Robert Nuzum, Thesis: "Aircraft Thermal Management using Liquefied Natural Gas", Apr. 27, 2016, Wright State University, Dayton, Ohio.
Extended European Search Report dated Mar. 31, 2022 for European Patent Application No. 20910078.3 (EP stage of PCT/US20/67289-WO/2021/138307).
Extended European Search Report dated Mar. 31, 2022 for European Patent Application No. 21191780.2 (EP divisional of PCT/US20/67289-WO/2021/138307).

* cited by examiner

AIRCRAFT HEAT EXCHANGER PANEL ARRAY INTERCONNECTION

CROSS-REFERENCE TO RELATED APPLICATIONS

Benefit is claimed of U.S. Patent Application No. 62/957,091, filed Jan. 3, 2020, and entitled "Aircraft Heat Exchanger Assembly" and U.S. Patent Application No. 62/971,446, filed Feb. 7, 2020, and entitled "Aircraft Heat Exchanger Panel Array Interconnection", the disclosures of which are incorporated by reference herein in their entireties as if set forth at length.

BACKGROUND

The disclosure relates to gas turbine engine heat exchangers. More particularly, the disclosure relates to air-to-air heat exchangers.

Gas turbine engines (used in propulsion and power applications and broadly inclusive of turbojets, turboprops, turbofans, turboshafts, industrial gas turbines, and the like) include a variety of heat exchangers. Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An exemplary positioning of such a heat exchanger provides for the transfer of thermal energy from a flow (heat donor flow) diverted from an engine core flow to a bypass flow (heat recipient flow). For example, air is often diverted from the compressor for purposes such as cooling the turbine or aircraft systems. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use).

U.S. Pat. No. 10,100,740 (the '740 patent, the disclosure of which is incorporated by reference in its entirety herein as if set forth at length), to Thomas, Oct. 16, 2018, "Curved plate/fin heater exchanger", shows attachment of a square wave form fin array to the side of a heat exchanger plate body. For radially-extending plates in a radial array, the wave amplitude progressively increases to accommodate a similar increase in inter-plate spacing.

SUMMARY

One aspect of the disclosure involves a heat exchanger for providing thermal energy transfer between a first flow along a first flowpath and a second flow along a second flowpath. The heat exchanger has: at least one plate bank; an inlet manifold; and an outlet manifold. The plate bank has a plurality of plates, each plate having: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath. The inlet manifold has at least one inlet port and at least one outlet port. The outlet manifold has at least one outlet port and at least one inlet port. The first flowpath passes from the at least one inlet port of the inlet manifold, through the at least one passageway of each of the plurality of plates, and through the at least one outlet port of the outlet manifold. The heat exchanger has means linking distal portions of the plates.

A further embodiment of any of the foregoing embodiments may additionally and/or alternatively include, in the at least one plate bank, the plates being parallel to each other.

A further embodiment of any of the foregoing embodiments may additionally and/or alternatively include for each said plate bank the means comprising a shroud interfitting with the distal portions of the plates of said bank.

A further embodiment of any of the foregoing embodiments may additionally and/or alternatively include for each said plate bank the shroud having respective slots receiving said distal portions of the plates of said bank.

A further embodiment of any of the foregoing embodiments may additionally and/or alternatively include for each said plate bank said distal portions of adjacent plates of said bank being coupled by a connector secured to at least one of the distal portions.

A further embodiment of any of the foregoing embodiments may additionally and/or alternatively include the connector being secured to both adjacent plates.

A further embodiment of any of the foregoing embodiments may additionally and/or alternatively include the connector straddling an intact portion of the shroud between adjacent said slots.

A further embodiment of any of the foregoing embodiments may additionally and/or alternatively include the connector being a U-shaped channel brazed or welded to both adjacent plates.

A further embodiment of any of the foregoing embodiments may additionally and/or alternatively include for each said plate bank said distal portions of adjacent plates of said bank being coupled by a connector secured to at least one of the distal portions.

A further embodiment of any of the foregoing embodiments may additionally and/or alternatively include the connector being secured to both adjacent plates.

A further embodiment of any of the foregoing embodiments may additionally and/or alternatively include the connector being a U-shaped channel.

A further embodiment of any of the foregoing embodiments may additionally and/or alternatively include the connector having a first portion secured to one of the adjacent plates and a second portion spanning a gap to the other said adjacent plate and secured to or frictionally engaged with the distal edge of said other adjacent plate.

A further embodiment of any of the foregoing embodiments may additionally and/or alternatively include the connector being an L-sectioned member having a foot secured to one of the adjacent plates and a leg spanning a gap to the other said adjacent plate and secured to or frictionally engaged with the distal edge of said other adjacent plate.

A further embodiment of any of the foregoing embodiments may additionally and/or alternatively include, for each said plate bank, the means comprising, for at least some of the plurality of plates, an extension protruding from the first face in proximity to the distal edge to make contact with an adjacent plate.

A further embodiment of any of the foregoing embodiments may additionally and/or alternatively include, the extension being secured to said adjacent plate.

A further embodiment of any of the foregoing embodiments may additionally and/or alternatively include, the extension being in frictional contact with one or more adjacent panels is a frictional interaction with the adjacent plate.

A further embodiment of any of the foregoing embodiments may additionally and/or alternatively include: the extension being a first extension; said at least some of the plates further comprise a second extension protruding from the second face in proximity to the distal edge; and said contact for each pair of adjacent plates is between a first extension of one plate and a second extension of the other plate.

A further embodiment of any of the foregoing embodiments may additionally and/or alternatively include, for each plate, end faces of the first extension and second extension being off parallel to a plate centerplane by a respective angle of 40° to 70°.

A further embodiment of any of the foregoing embodiments may additionally and/or alternatively include, for each plate of the plurality of plates, the at least one passageway comprising: an inlet plenum extending from the at least one inlet port of the plate; an outlet plenum extending to the at least one outlet port of the plate; and a plurality of legs fluidically in parallel between the inlet plenum and the outlet plenum.

A further embodiment of any of the foregoing embodiments may additionally and/or alternatively include the inlet plenum being adjacent the trailing edge and the outlet plenum being adjacent the leading edge.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
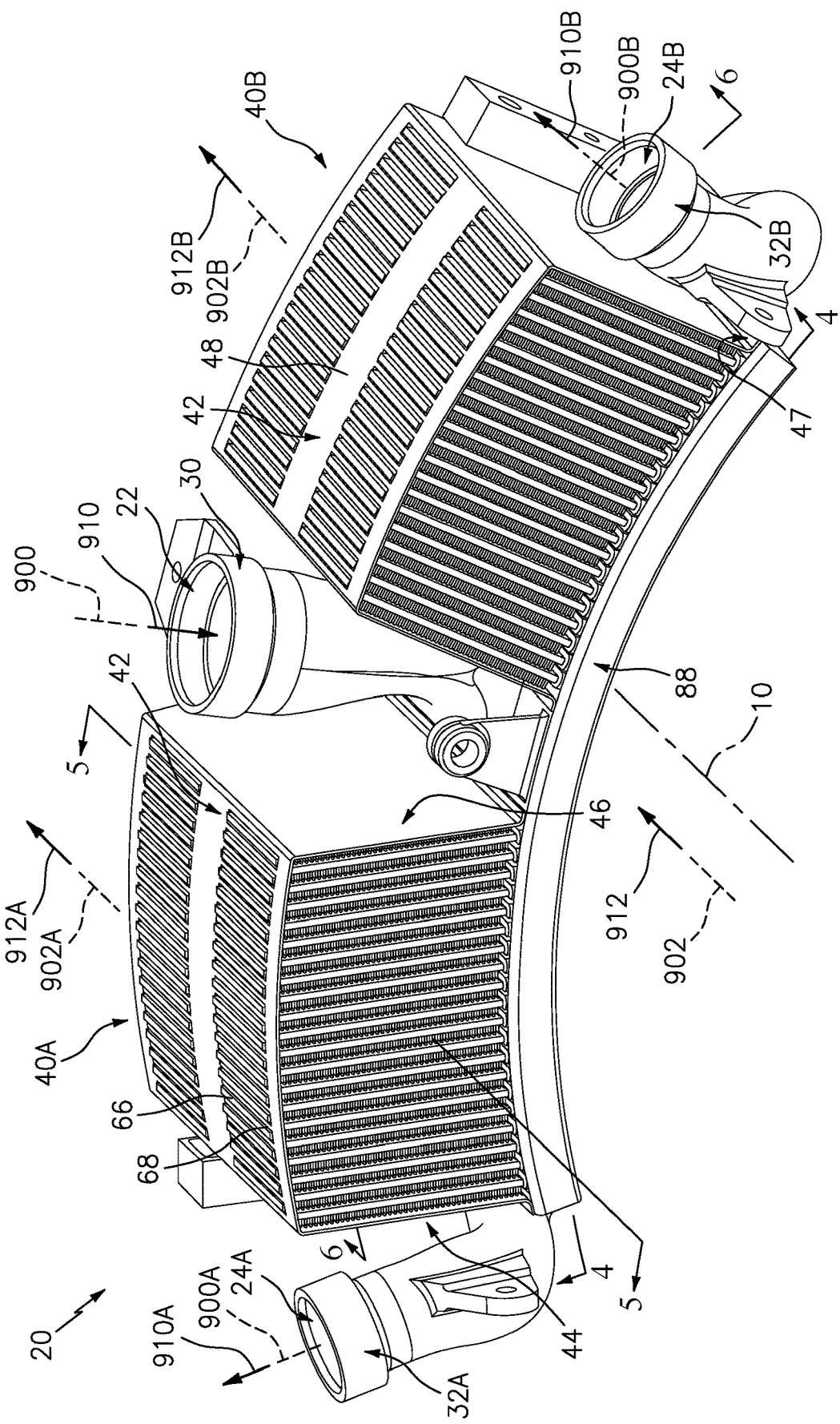
FIG. 1 is a view of a heat exchanger.

FIG. 1 shows a gas turbine engine heat exchanger 20 providing heat exchange between a first flowpath 900 and a second flowpath 902 and thus between their respective first and second fluid flows 910 and 912. The exemplary configuration is based on the first embodiment of U.S. Patent Application No. 62/957,091 (the '091 application), filed Jan. 3, 2020, and entitled "Aircraft Heat Exchanger Assembly", the disclosure of which is incorporated by reference herein in its entirety as if set forth at length. In the exemplary embodiment, the flowpaths 900, 902 are gas flowpaths passing respective gas flows 910, 912. In the illustrated example, the first flow 910 enters and exits the heat exchanger 20 as a single piped flow and exits as a branched flow 910A/910B along branches 900A/900B; whereas the flow 912 is sector portion of an axial annular flow surrounding a central longitudinal axis 10 of the heat exchanger and associated engine. The exemplary view has components such as mounting hardware, deflectors/blockers, and structural brace hardware removed for purposes of illustration.

The heat exchanger 20 has an inlet 22 and outlet 24A, 24B for the first flow. The exemplary inlet and outlet are, respectively, ports of an inlet manifold and an outlet manifold (discussed below). Exemplary manifolds are metallic (e.g., nickel-based superalloy). The inlet manifold and outlet manifold may each have a respective fitting 30, 32A, 32B providing the associated port 22, 24A, 24B. As is discussed further below, the inlet manifold and outlet manifold are coupled to heat exchanger plates of two exemplary plate (panel) arrays (banks) 40A, 40B. In the exemplary configuration, the single first flow inlet 22 is centrally between the banks open radially outward to receive an inward radial flow. Similarly, the two exemplary first flow outlets 24A, 24B are at circumferential outboard ends of the associated plate banks and are also open radially outward to discharge radially outward.

Each plate bank 40A, 40B comprises a circumferential array of plates (discussed further below). In the exemplary banks, the plates are parallel to each other. However, alternative banks may have the plates extending more exactly radially so as to diverge from each other in the outward radial direction.

In the exemplary embodiment, inner diameter (ID) edges of the plates mate to the manifolds and outer diameter (OD) edges of the plates of the banks are captured by respective shrouds 42. The shrouds 42 each have a first circumferential end 44 and a second circumferential end 46 abutting terminal plates of the associated bank. The ends are joined by an outer diameter (OD) circumferential wall 48. As discussed further below, the OD wall 48 has slots receiving associated projections of the plates to retain and register the plates. The shrouds thus bound duct sectors passing respective branches 902A, 902B of the second flow 912A, 912B along respective branches of the second flowpath 902.

Figure 2:
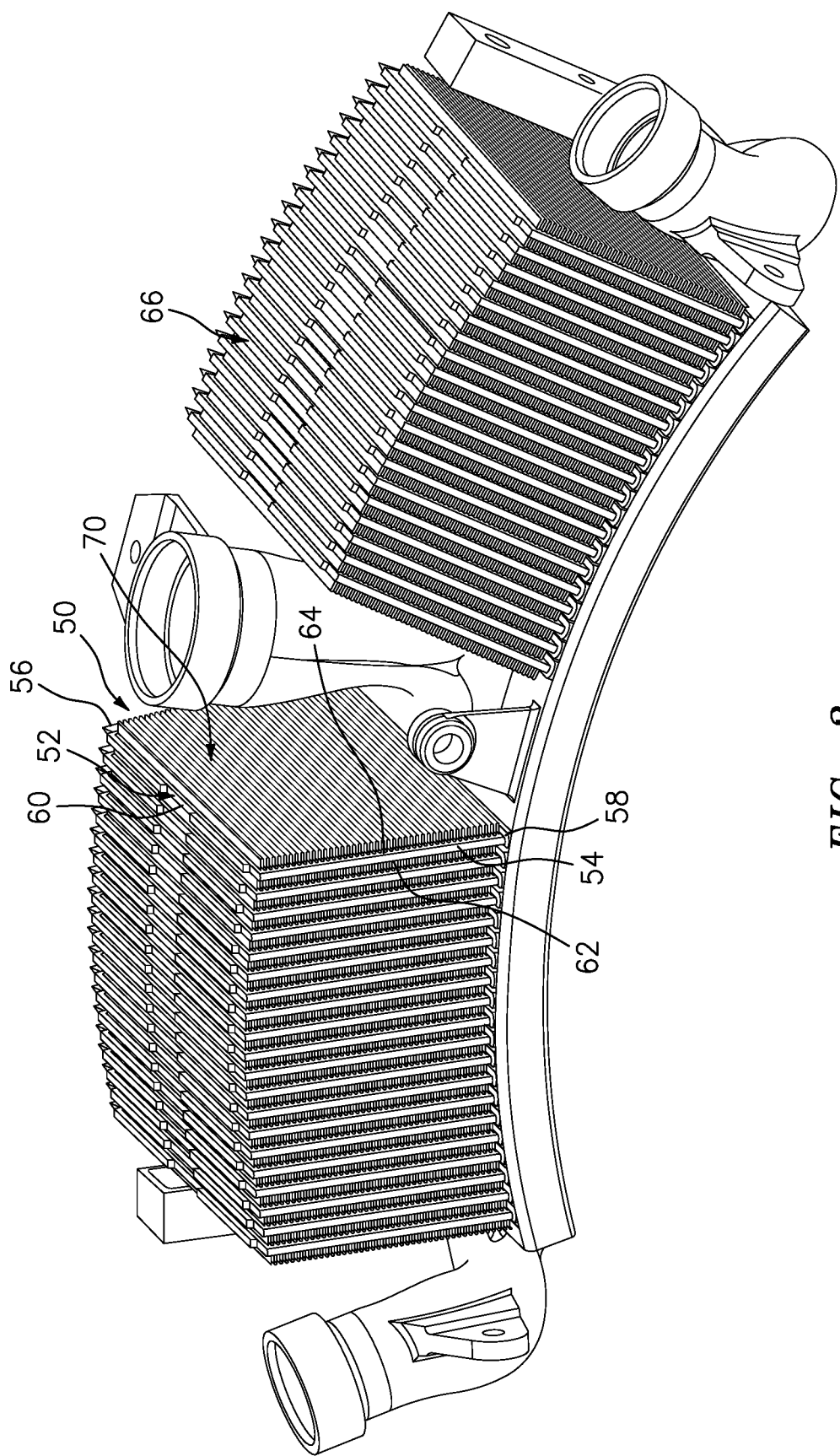
FIG. 2 is a view of the heat exchanger of FIG. 1 with plate bank shrouds removed.

FIG. 2 shows the heat exchanger with shrouds further removed for purposes of illustration.

Each plate 50 comprises a body or substrate 52 (e.g., cast or additively manufactured alloy such as nickel-based superalloy) having a leading edge 54, a trailing edge 56, an inboard or inner diameter (ID) edge 58, an outboard or outer diameter (OD) edge 60, a first circumferential (generally circumferentially facing) face 62 and a second circumferential face 64. The OD edge 60 may bear one or more (two shown) projections 66 which become captured by associated slots 68 (FIG. 1) in the shroud OD wall 48 as noted above.

As is discussed below, one or both faces 62, 64 may bear fin arrays 70. Although fin arrays formed unitarily with the body or substrate are possible, the exemplary fins are separately formed (e.g., of folded sheetmetal—e.g., nickel-based superalloy) and secured to adjacent substrate(s) (generally see the '740 patent). As is discussed further below, exemplary fins are square wave corrugations of even height/amplitude so that the plates are parallel with each inter-plate gap in each bank being spanned by a respective one fin array whose peaks are secured to one adjacent substrate and troughs to the other (discussed further below).

Figure 3:
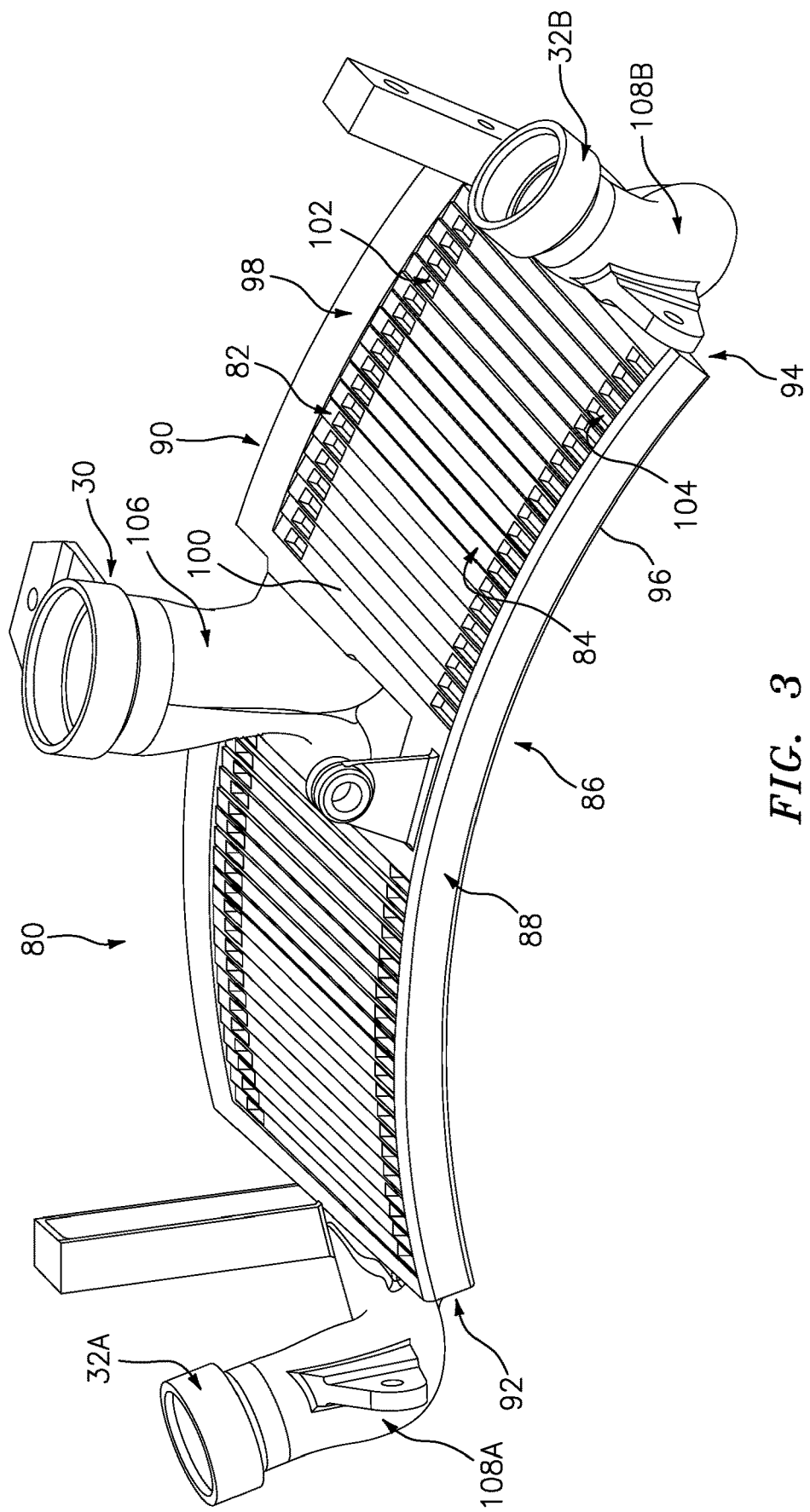
FIG. 3 is a view of an inner diameter (ID) manifold unit of the heat exchanger.

FIG. 3 shows further details of a single manifold unit 80 that forms both an inlet manifold 82 and an outlet manifold 84 of the heat exchanger. As is discussed further below, the outlet manifold 84 is fully split between sections respectively associated with the two banks 40A, 40B.

The manifold unit 80 comprises a main body 86 having a leading end 88, a trailing end 90, a first circumferential end 92, a second circumferential end 94, an inner diameter (ID) surface 96, and an outer diameter (OD) surface 98. The OD surface 98 has a plurality of mating features for receiving the associated plates (e.g., the ID edges 58 of the plate substrates). Exemplary features 100 are formed as sockets extending axially and having respective ports 102 and 104 for communicating with the plate interior (discussed further below). FIG. 3 further shows an integrally formed radial conduit 106 extending to the first flow inlet fitting 30 and respective integral conduits 108A, 108B extending to the respective first flow outlet fittings 32A, 32B. The exemplary conduit 106 protrudes radially from the main body OD surface 98. The conduits 108A, 108B protrude circumferentially from the associated main body ends 92 and 94, then turning radially outward at a bend.

Figure 4:
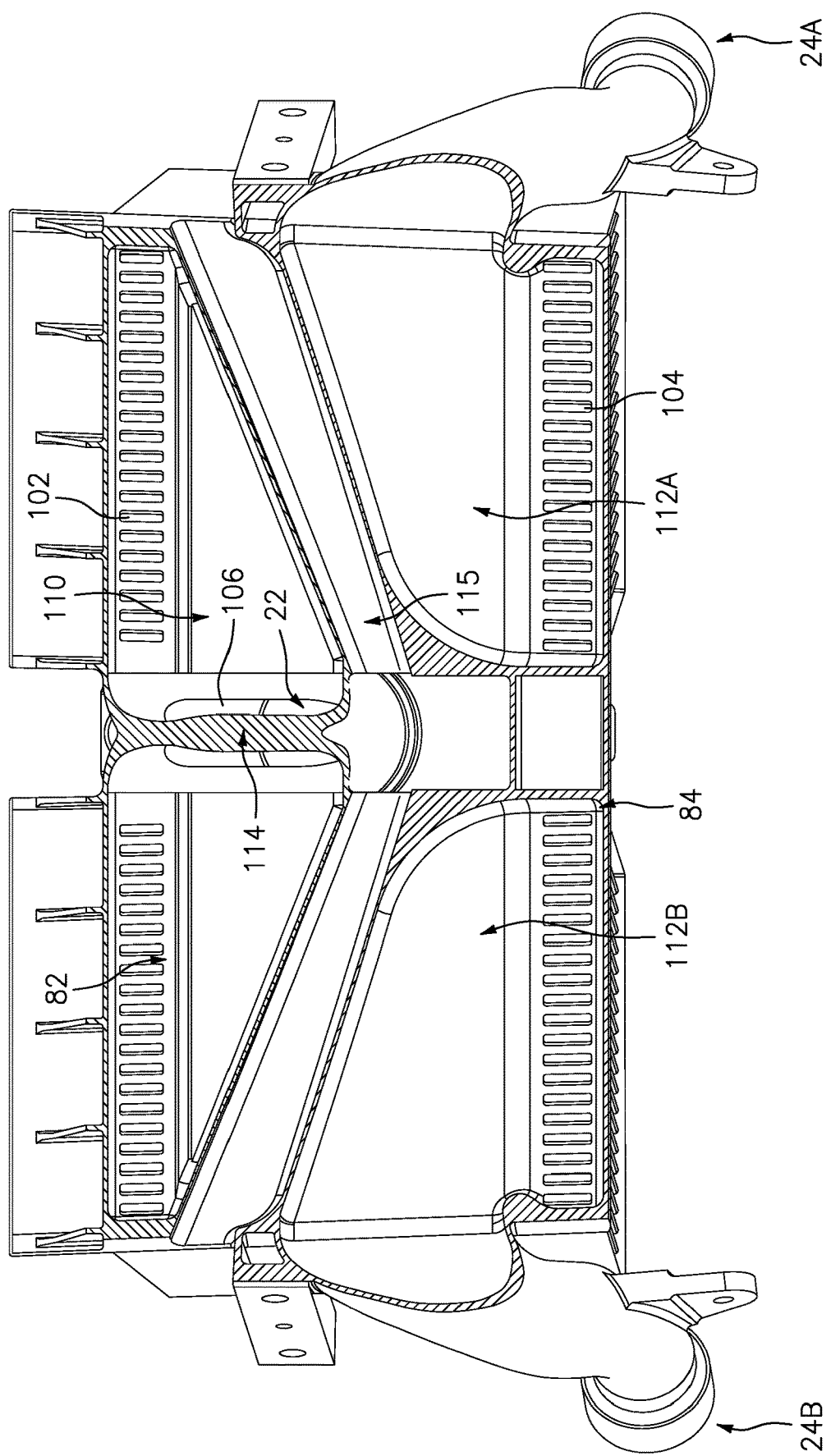
FIG. 4 is an outward radial cutaway view of the heat exchanger taken along line 4-4 of FIG. 1.

FIG. 4 is a circumferential sectional view viewed radially outward. FIG. 4 shows the inlet manifold 82 as including a plenum 110 extending from the inlet port 22 to the ports 102. The outlet manifold 84 comprises a pair of independent plenums 112A and 112B extending from the ports 104 of the associated array to the outlets 24A, 24B. FIG. 4 shows a dividing wall 114 extending partially outward into the conduit 106 to divide downstream sections of the plenum 110. A dead space or buffer cavity 115 divides the inlet manifold from the outlet manifold and divides the two plenums of the outlet manifold to effectively form two outlet manifolds in a single piece or assembly.

An exemplary manifold unit 80 may be formed of a nickel-based superalloy such as via casting, additive manufacture, and/or machining. Particularly if additively manufactured, assembly of multiple pieces may be required (e.g., via brazing, welding, or diffusion bonding).

Figure 5:
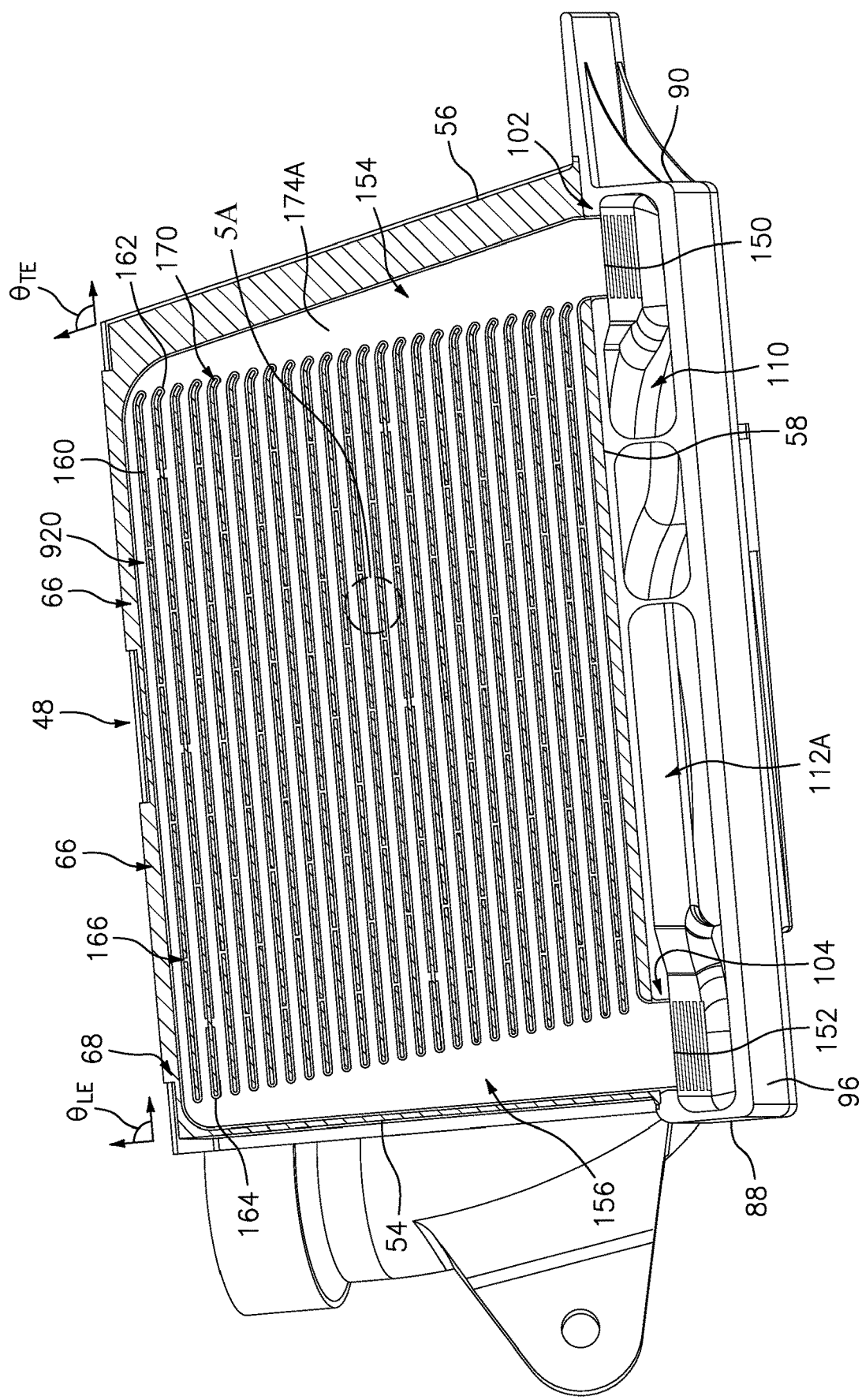
FIG. 5 is an approximately radial/axial sectional view of the heat exchanger taken along line 5-5 of FIG. 1 centrally through a plate.

FIG. 5 is a sectional view through a plate in the heat exchanger taken along line 5-5 of FIG. 1. Each plate has an interior providing an associated flowpath branch/leg from an inlet 150 of the plate to an outlet 152. The exemplary inlets and outlets are along the ID edge 58 (e.g., on plugs protruding from a flat main portion of the ID edge and received in the respective ports 102 and 104). The inlet 150 feeds an inlet plenum 154 adjacent/along the trailing edge while the outlet 152 is fed by a plenum 156 along the leading edge.

Figure 6:
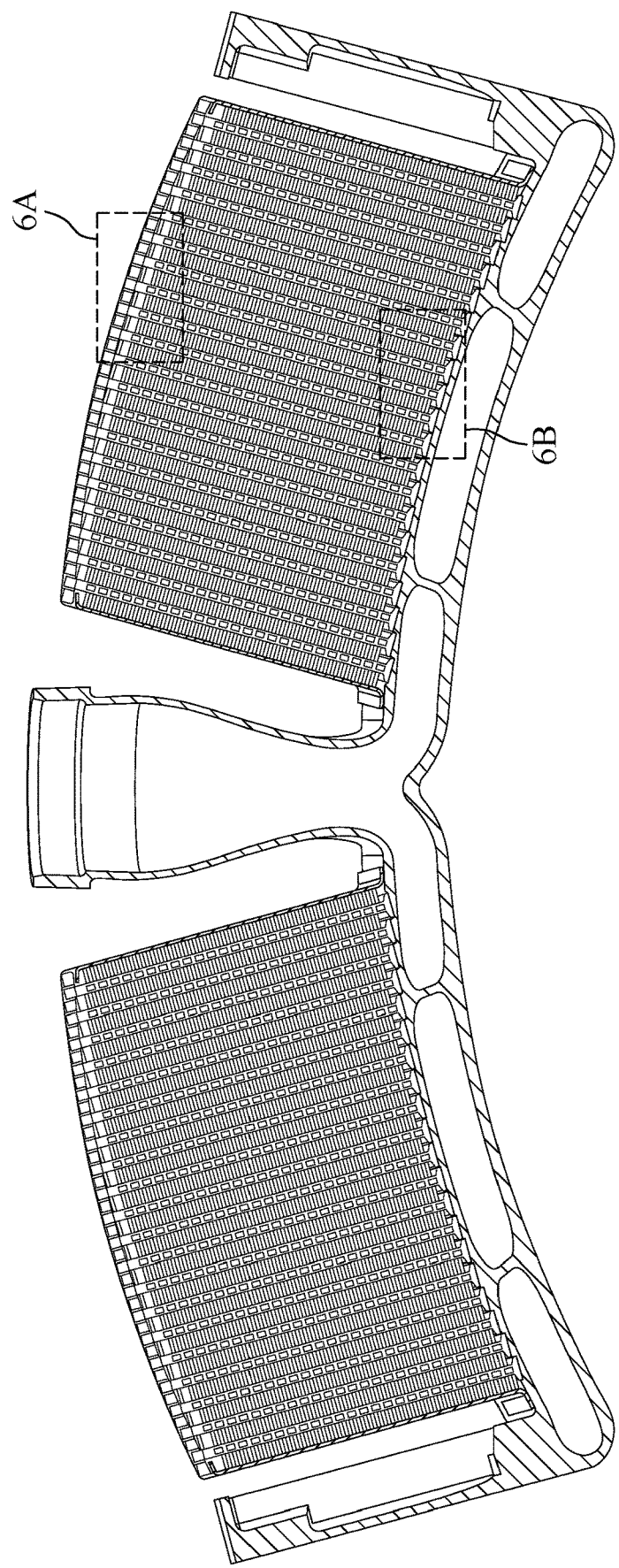
FIG. 6 is a transverse sectional view of the heat exchanger of FIG. 1 taken along line 6-6.
Figure 6A:
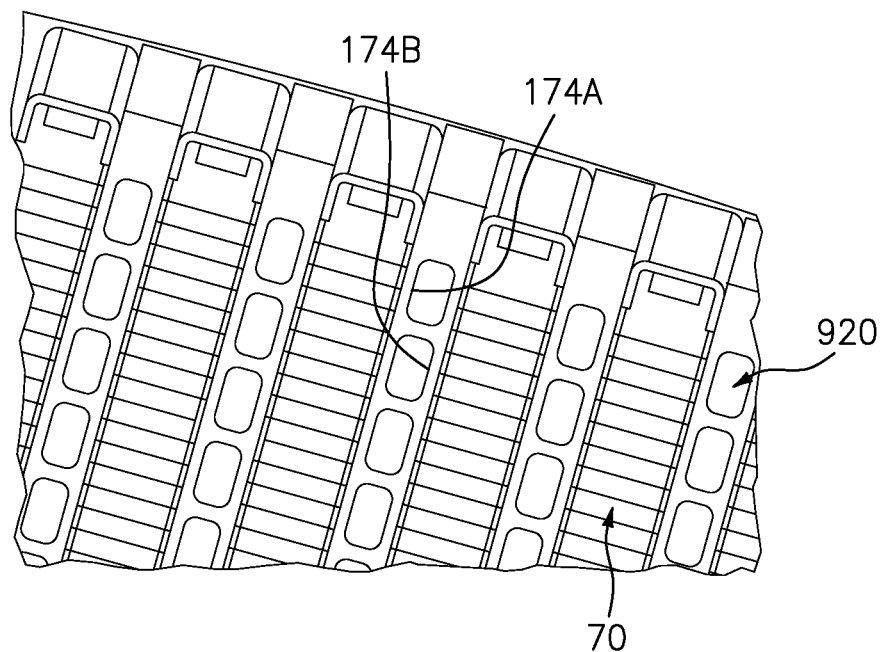
FIG. 6A is a first enlarged view of the heat exchanger of FIG. 6.
Figure 6B:
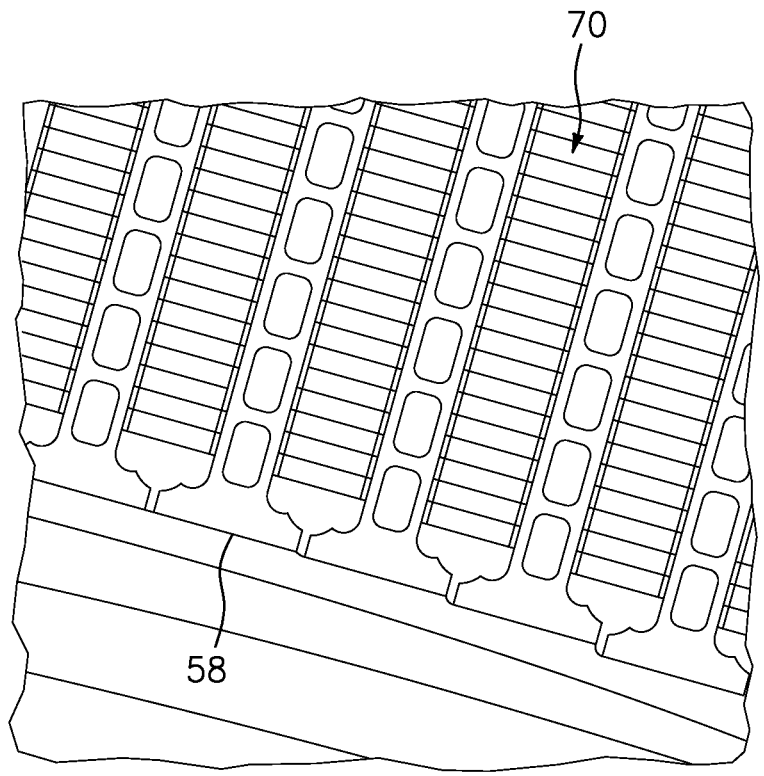
FIG. 6B is a second enlarged view of the heat exchanger of FIG. 6.

A generally radial array of flowpath legs (sublegs) 920 extend between the inlet plenum 154 and outlet plenum 156. The adjacent flowpath legs 920 are separated from each other by wall structures 160. Each wall structure 160 extends from a leading end 162 to a trailing end 164 (along the first flowpath). The exemplary wall structures may have gaps 166. The gaps may provide pressure equalization and/or may be artifacts of a casting process wherein core legs forming the passageway legs 920 are held in alignment with each other by webs that in turn cast the gaps. The exemplary wall structures 160 are straight with the exception of guide turns 170 extending a short distance from the leading edge 162 to guide air from a generally radially outward flow within the plenum 154 and shift that air generally axially. Although the outlet plenum 156 may have similar turns, modeling shows these to be less advantageous at the outlet plenum. The wall structures 160 span between adjacent interior faces 174A, 174B (FIG. 6).

The wall structures 160 may divide internal flows into smaller passages, thereby increasing surface area, more equally distributing, and/or accelerating internal flows. They may also tie the walls of the plate together to prevent ballooning under elevated temperatures and pressures.

The exemplary inlet plenum 154 converges in axial dimension from ID to OD or downstream along the first flowpath. Similarly, the exemplary outlet plenum 156 diverges in axial dimension from OD to ID or downstream along the first flowpath toward the outlet 152. Such respective convergence and divergence may reduce internal losses and prevents separation of flow.

Figure 5A:
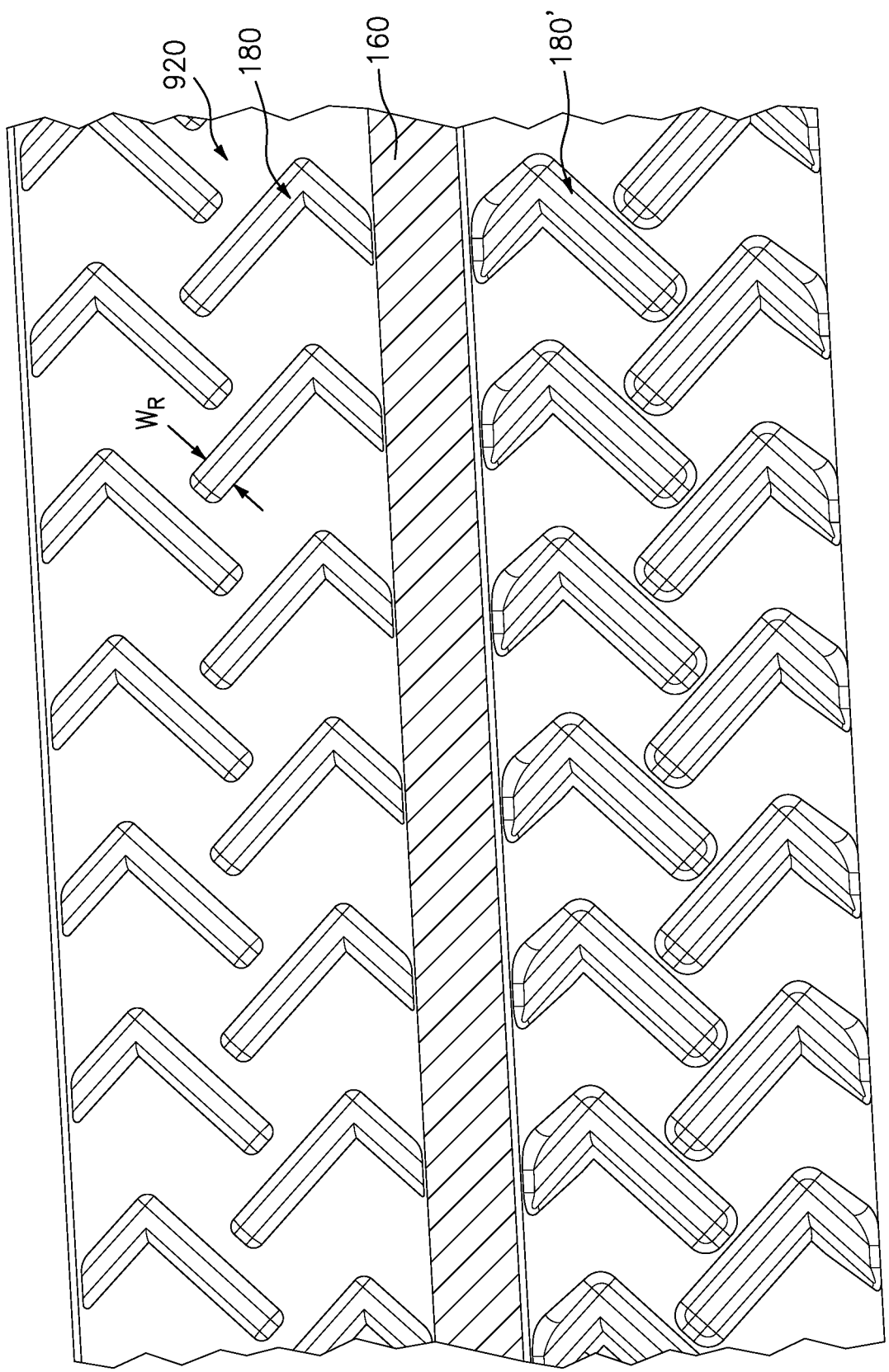
FIG. 5A is an enlarged view of a portion of the plate of FIG. 5.

The interior of the plate may optionally include integral surface enhancement features. FIG. 5A shows exemplary features 180/180' as chevron ribs, apex-upstream, within the flow passage legs 920. An exemplary configuration places the ribs in rows with two rows in each passageway, each row bridging up the adjacent surface of the adjacent wall 60 and opposite ends of the ribs of each row interdigitating slightly. The chevron features serve as trip strips to locally increase the surface friction at the boundary layer (increasing the local heat transfer coefficient) and to develop a mixing vortex within each passage leg 920 (to more uniformly distribute thermal energy within the first flowpath). Furthermore, there are a multitude of integral surface enhancement features known in the art. Notable alternatives include trip strips (or turbulators) perpendicular to the flow or skewed at an angle. Ribs 180' differ from the ribs 180 in that they have extended filleting.

FIG. 6 shows fin arrays 70 spanning the gaps between each adjacent plate substrate. The terminal plates in each array may similarly have fins spanning to the adjacent shroud 42 circumferential end 44, 46.

Figure 7:
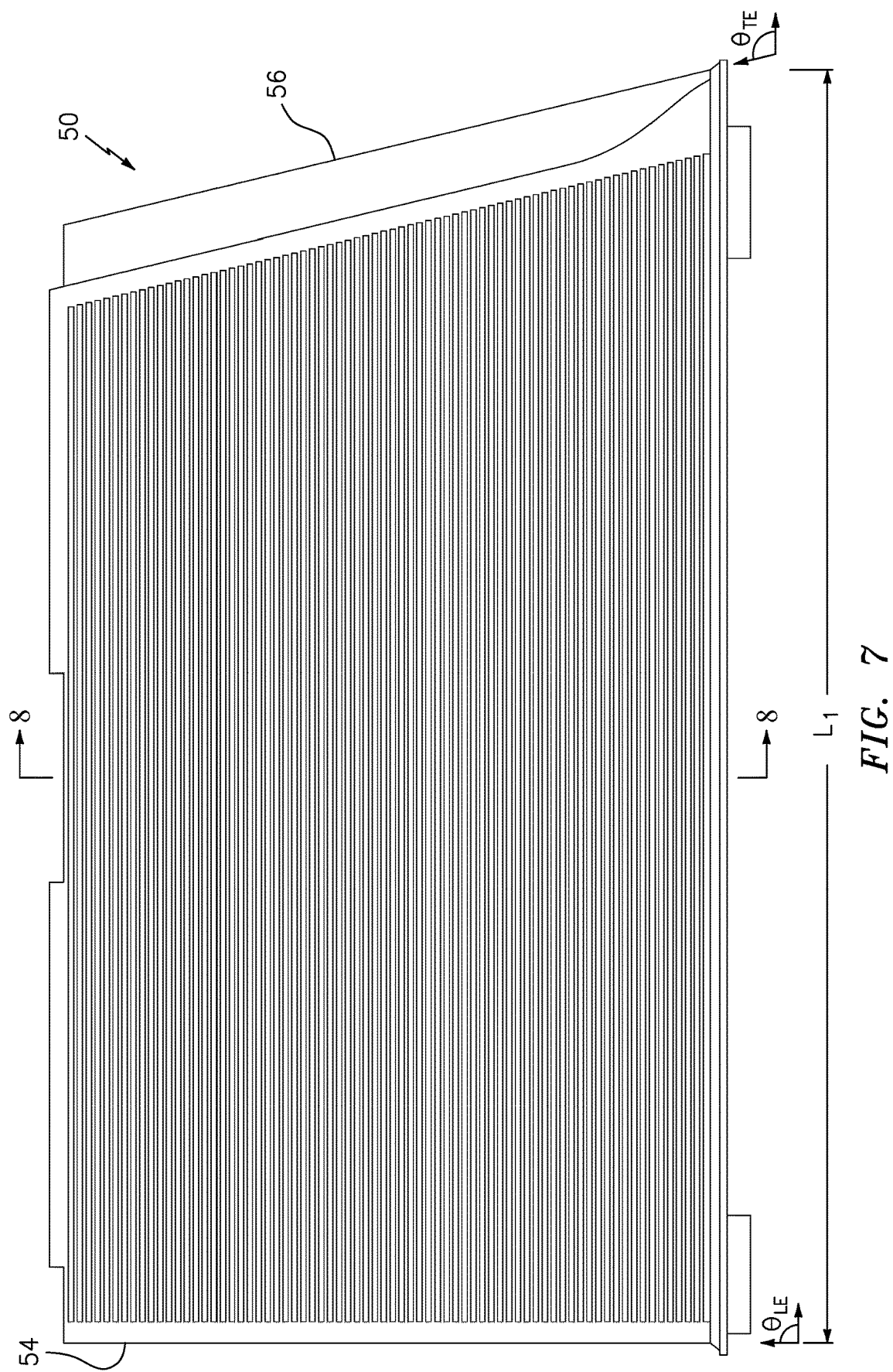
FIG. 7 is a side view of a plate of the heat exchanger.
Figures 8, 8A:
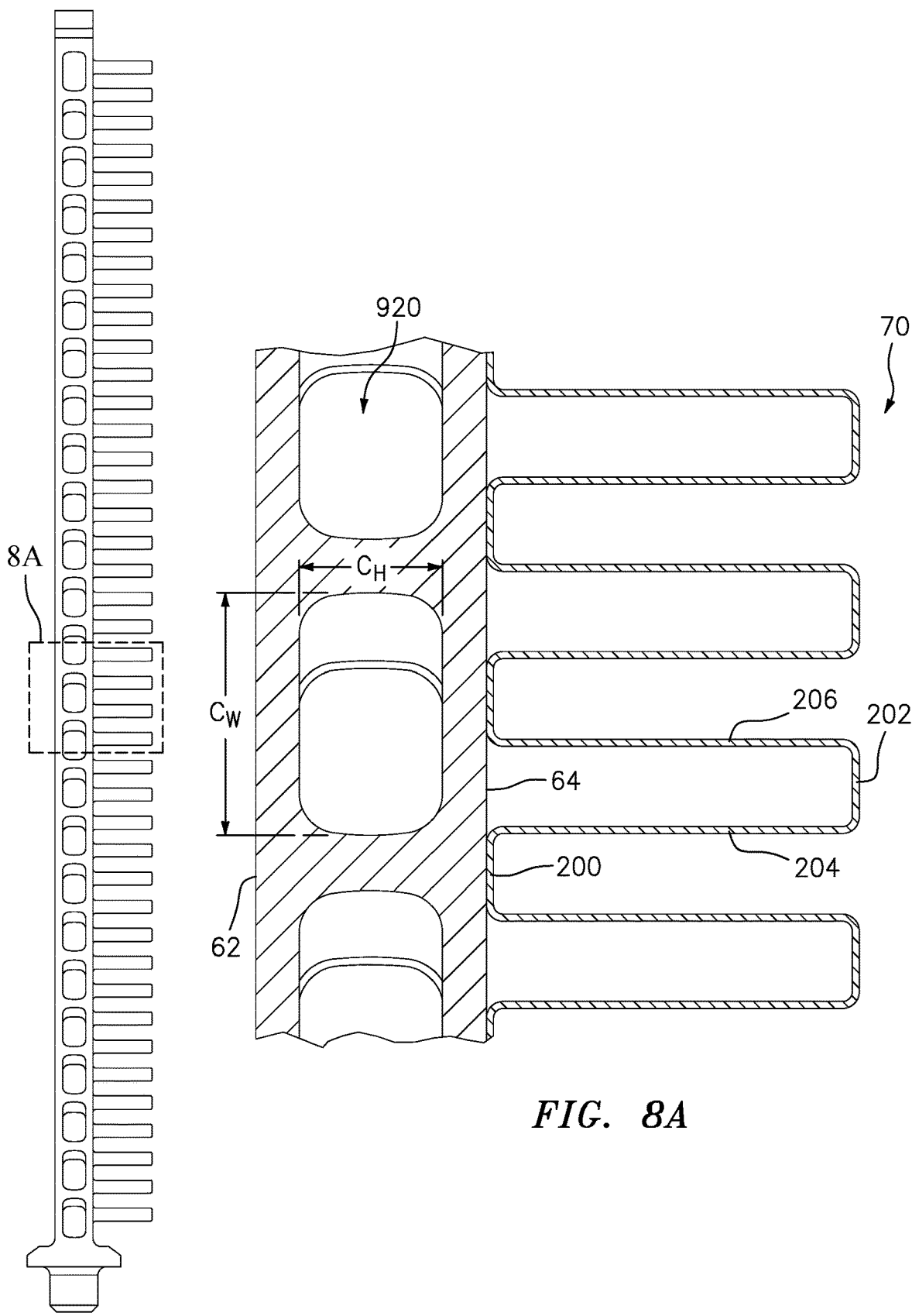
FIG. 8 is a transverse sectional view of the plate of FIG. 7 taken along line 8-8.
FIG. 8A is an enlarged view of the plate of FIG. 8.

FIG. 7 shows a preassembly of a plate substrate and a single fin array. The exemplary plate has an array only on the second circumferential face 64 so that the first circumferential face 62 of the adjacent plate to the second side of that plate does not have a separate such fin array. The exemplary square wave nature (e.g., with rounded corners) of the fin array 70 (FIG. 8A) has a series of troughs 200 and peaks 202 with legs 204, 206 extending between adjacent troughs and peaks. The legs thus form the ultimate fins. The exemplary troughs are attached to the second circumferential face 64 such as by welding, brazing, diffusion bonding, or the like. When a plate array is assembled, the peaks 202 will contact the adjacent first circumferential face 62 of the next plate substrate. To improve heat transfer, upon such assembly, there may be a diffusion bond, braze, or weld, securing the peaks 202 to such adjacent first circumferential face 62 (or the adjacent shroud wall). As noted above, where needed, a terminal plate in the plate bank may be initially fabricated with fin arrays 70 on both faces 62 and 64. FIG. 8A also identifies the cross-sectional width $C_W$ and the cross-sectional height $C_H$ of the passage leg 920. These features are further discussed below.

Figure 9:
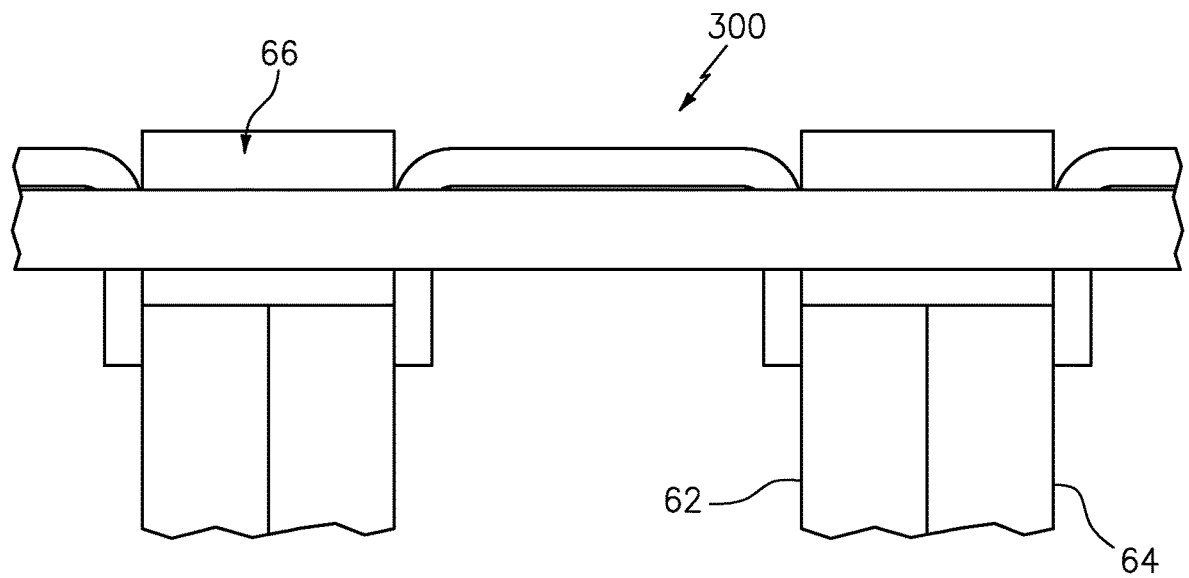
FIG. 9 is an end view of an inter-plate connection in the heat exchanger.
Figure 10:
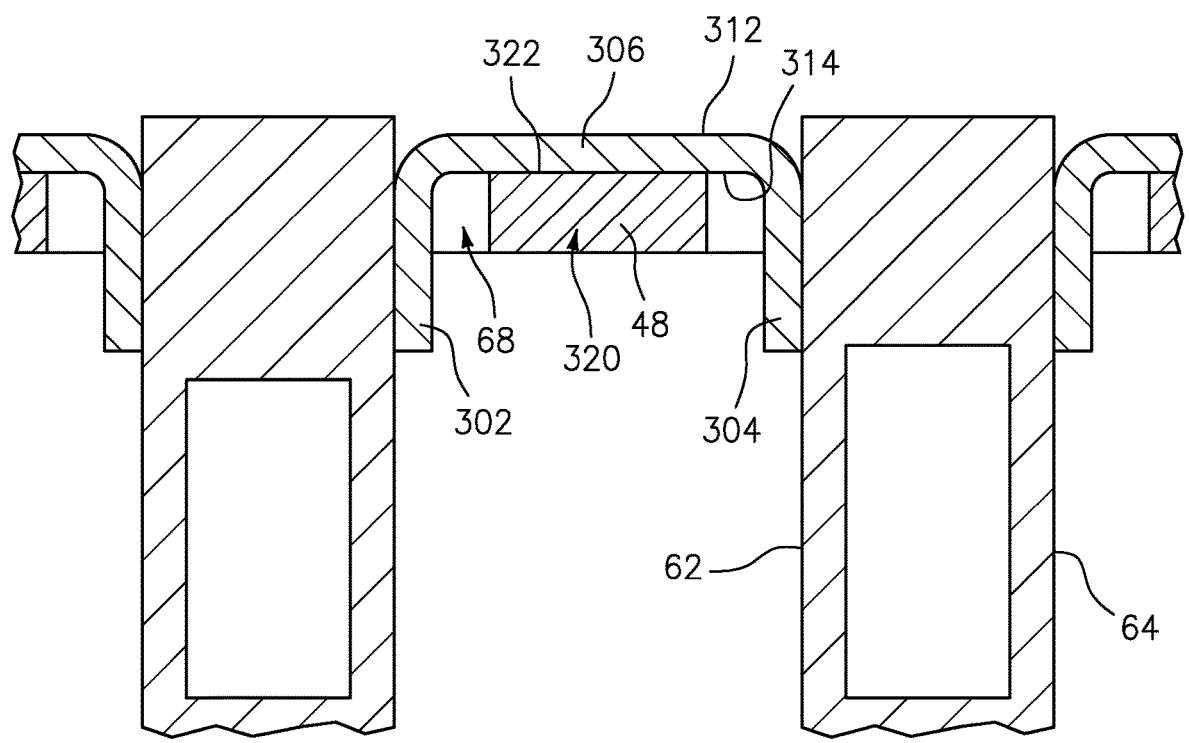
FIG. 10 is a sectional view of the inter-plate connection of FIG. 9.

As noted above, the shroud OD wall 48 may engage distal portions of the plates 50. Thus, the shroud may structurally link the distal portions of the plates. This linking may both increase rigidity and damp vibration. The balance of rigidity and damping may depend on the relative compliance of any particular linking. The increased rigidity will increase resonant frequencies. Low resonant frequencies may result in high cycle fatigue (HCF) failure. Damping mechanisms may both increase resonant frequencies and moderate the effects of resonance. In one basic example of increasing rigidity via the shroud, the plate projections 66 may be brazed or welded to the shroud at the slots 68. However, FIGS. 9 and 10 show a modified linking in which the adjacent plates are linked by connectors 300 which may be in frictional engagement with the shroud. In the exemplary embodiment, each connector 300 is formed as a U-sectioned channel having a pair of legs or sidewalls 302, 304 and a channel base or web 306. Outboard faces of the legs (along channel outer surface 312) are secured to the adjacent faces 62, 64 of the plates' substrate proximate the projections 66. This exemplary connector 300 material is an alloy such as a nickel-based superalloy braze or weld-compatible with the plate substrates. In the exemplary embodiment, the channel straddles an intact segment 320 of the shroud outer wall 48 between adjacent slots 68. In the exemplary embodiment, the inner surface 314 of the channel along the base/web 306 may be in light frictional engagement with the outboard surface 322 of the shroud along the segment 320. The slots 68 may be sufficiently wide to allow relative movement of the plates such as to accommodate differential thermal expansion and structural loads while vibration is further damped by the frictional interaction.

In an alternative embodiment (not shown), similar channel-sectioned connectors may bridge plates that do not have projections received in slots of the shroud. Thus, the outer surface of the base/web 306 may frictionally engage the inner surface of such unslotted shroud.

Figure 11:
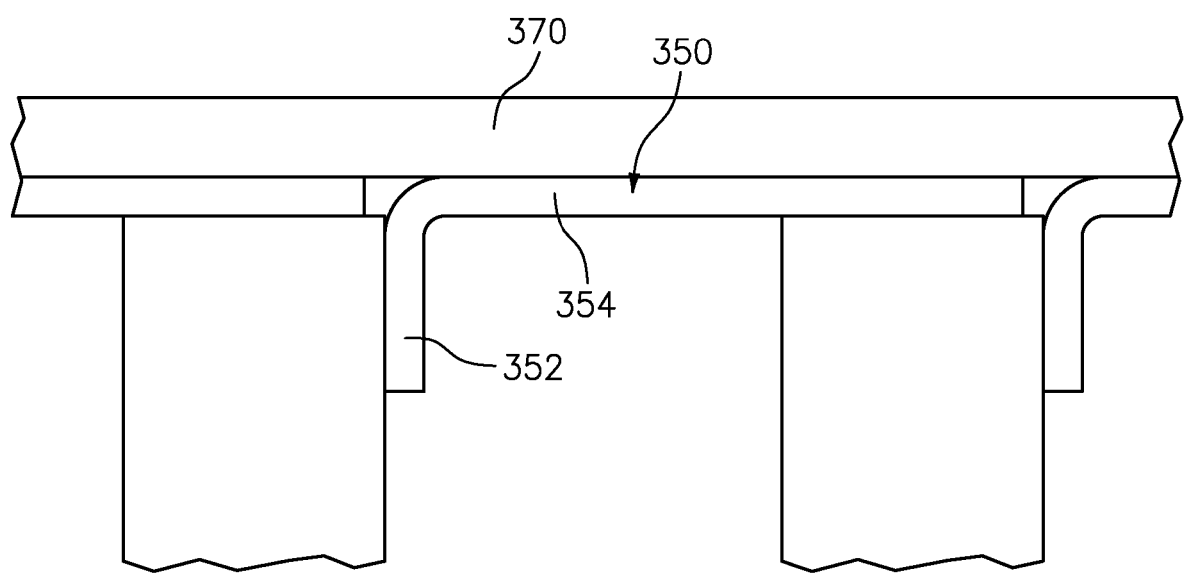
FIG. 11 is an end view of an alternate inter-plate connection.

FIG. 11 shows an alternative damping configuration using an L-sectioned connector 350 with an unslotted shroud 370. The connector has a foot 352 and a leg 354. The outer surface of the connector 350 along the foot 352 (outer face of the foot) is secured to one face of an adjacent plate with the leg 354 spanning a gap to the other adjacent plate. The outer surface of the connector 350 along the leg 354 (outer face of the leg) frictionally engages the underside or inner surface of the shroud outer wall. The inner surface of the connector along the leg 354 may be frictionally engaged to the distal edge of the adjacent plate or may be secured thereto such as via brazing or welding.

Figure 12:
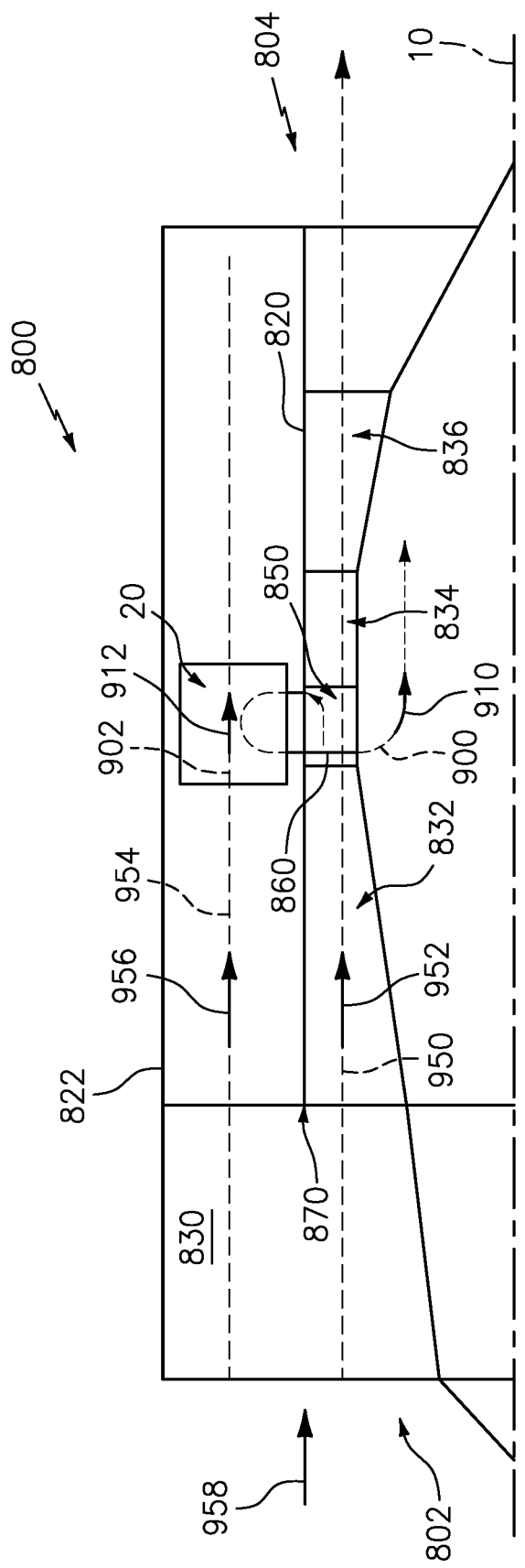
FIG. 12 is a schematic view of a gas turbine engine including the heat exchanger of FIG. 1.

FIG. 12 schematically shows a gas turbine engine 800 as a turbofan engine having a centerline or central longitudinal axis 10 and extending from an upstream end at an inlet 802 to a downstream end at an outlet 804. The exemplary engine schematically includes a core flowpath 950 passing a core flow 952 and a bypass flowpath 954 passing a bypass flow 956. The core flow and bypass flow are initially formed by respective portions of a combined inlet airflow 958 divided at a splitter 870.

A core case or other structure 820 divides the core flowpath from the bypass flowpath. The bypass flowpath is, in turn, surrounded by an outer case 822 which, depending upon implementation, may be a fan case. From upstream to downstream, the engine includes a fan section 830 having one or more fan blade stages, a compressor 832 having one or more sections each having one or more blade stages, a combustor 834 (e.g., annular, can-type, or reverse flow), and a turbine 836 again having one or more sections each having one or more blade stages. For example, many so-called two-spool engines have two compressor sections and two turbine sections with each turbine section driving a respective associated compressor section and a lower pressure downstream turbine section also driving the fan (optionally via a gear reduction). Yet other arrangements are possible.

FIG. 12 shows the heat exchanger 20 (or other heat exchanger above) positioned in the bypass flowpath so that a portion of the bypass flowpath 954 becomes the second flowpath 902 and a portion of the bypass flow 956 becomes the second airflow 912.

The exemplary first airflow 910 is drawn as a compressed bleed flow from a diffuser case 850 between the compressor 832 and combustor 834 and returned radially inwardly back through the core flowpath 950 via struts 860. Thus, the flowpath 900 is a bleed flowpath branching from the core flowpath.

Figure 13:
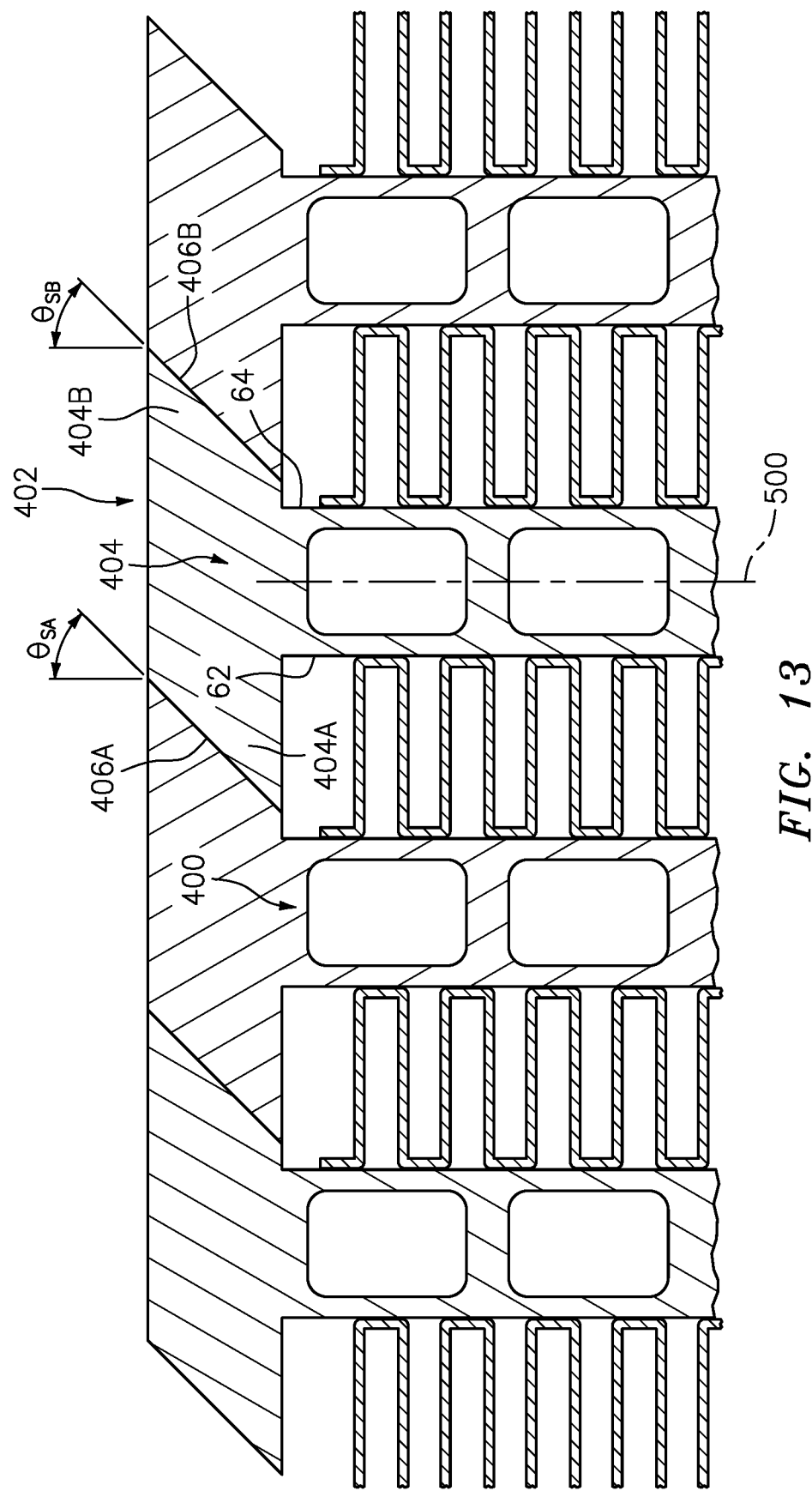
FIG. 13 is an end view of a second alternate inter-plate connection.

FIG. 13 shows a further variation of a plate 400 where the distal edge 402 is formed along a shroud-like projection 404 (shroud) extending from one or both faces 62, 64. The exemplary projection has portions 404A, 404B (protrusions or extensions) protruding from the respective faces and having complementarily angled surfaces 406A, 406B. Except at ends of the array, each surface 406A contacts an adjacent surface 406B. Frictional damping occurs when movement of the shroud-like projection 404 causes the angled surface 406A of one panel to slide across the angled surface 406B of an adjacent panel. In further variations on such a plate configuration, instead of frictional engagement, the shrouds may be secured such as by brazing. Exemplary faces are off parallel to a plate centerplane by a respective angle $\theta_{SA}$ and $\theta_{SB}$ of 40° to 70°, more particularly 45° to 55°. For parallel faces 62, 64, $\theta_{SA}$ and $\theta_{SB}$ are also relative to the respective faces. Relative to lower angles (e.g., 0°), the angling facilitates a frictional damping engagement between shrouds. Without the frictional damping the shrouds may be subject to stresses that could lead to failure. The two angles may be the same (e.g., as in an array with parallel plate centerplanes) or may be different (e.g., converging toward the centerline 10 to accommodate a progressive change in orientation such as where the centerplanes are radial). With such radial centerplanes, the two angles would differ by the on-center angular plate spacing (e.g., 360° divided by the plate count for a full annular array thus 3.6° for a circumferential array of one hundred evenly-spaced plates or 5.0° for seventy-two). Thus, the difference will likely be 10° or less, more narrowly 5.0° or less.

At ends of the array, the shroud-like projections are not required and may or may not be present. The shroud-like projections may be present on all plates to provide commonality with the remainder of the plates in the array and simplify the manufacturing process. Alternatively, the heat exchanger plates at the two ends of the bank/array may be special end plates that have the protrusions only to the inboard side (facing into the bank/array), leaving the terminal plate exposed. Alternatively, at each end of the bank/array, there may be a protective end wall fixed to the manifold (e.g., brazed nickel-based superalloy plate or casting) and extending parallel to the terminal heat exchanger plate in the array and interfacing with the outboard projection of such terminal plate (e.g., with similar frictional engagement).

Alternatively, such end walls may be rigidly attached to the respective terminal plate outboard faces of the bank/array. This could involve brazing to the plate protrusion 404A,404B or attaching to an alternative feature instead of the particular protrusion 404A,404B. The latter is particularly applicable to sheet metal (e.g., nickel-based superalloy) end walls that do not add rigidity. In such a case, the terminal protrusion may merely be flat and at a zero degree angle for brazing to a face of the end wall.

In embodiments with protective end walls, an optional outer wall may bridge the two end walls to form a shroud to further hold the array together (e.g., unitarily formed with the end walls in a sheet metal embodiment).

Various further shroud geometry may be adopted from the field of shrouded turbine blades.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A heat exchanger for providing thermal energy transfer between a first flow along a first flowpath and a second flow along a second flowpath, the heat exchanger comprising:
   at least one plate bank comprising a plurality of plates, each plate having:
      a first face and a second face opposite the first face;
      a leading edge along the second flowpath and a trailing edge along the second flowpath;
      a proximal edge having at least one inlet port along the first flowpath and at least one outlet port along the first flowpath; and
      at least one passageway along the first flowpath;
   an inlet manifold having at least one inlet port and at least one outlet port;
   an outlet manifold having at least one outlet port and at least one inlet port, the first flowpath passing from the at least one inlet port of the inlet manifold, through the at least one passageway of each of the plurality of plates, and through the at least one outlet port of the outlet manifold;
   for each said plate bank, a shroud having respective slots receiving distal portions of the plates of said bank;
   for each said plate bank said distal portions of adjacent plates of said bank are coupled by a connector secured both of the distal portions; and
   the connector straddles an intact portion of the shroud between adjacent said slots.

2. The heat exchanger of claim 1 wherein:
in the at least one plate bank, the plates are parallel to each other.

3. The heat exchanger of claim 1 wherein:
for each said plate, the distal portion comprises a pair of projections; and
for each said plate bank the shroud has, for each associated plate, a pair of said slots respectively receiving the projections of the plate distal portion.

4. The heat exchanger of claim 3 wherein:
respective pairs of said connectors are associated with the respective pairs of projections.

5. The heat exchanger of claim 4 wherein:
each said connector is a U-shaped channel brazed or welded to both adjacent plates.

6. The heat exchanger of claim 5 wherein:
each said connector is in frictional engagement with the associated shroud.

7. The heat exchanger of claim 6 wherein:
the frictional engagement is between an inner surface of the connector and an outboard surface of the shroud along the intact portion of the shroud between adjacent said slots.

8. The heat exchanger of claim 1 wherein:
the connector is a U-shaped channel brazed or welded to both adjacent plates.

9. The heat exchanger of claim 8 wherein:
each said connector is in frictional engagement with the associated shroud.

10. The heat exchanger of claim 9 wherein:
the slots are sufficiently wide to allow relative movement of the associated plates.

11. The heat exchanger of claim 1 wherein:
each said connector is a U-shaped channel.

12. The heat exchanger of claim 1 wherein:
the slots are sufficiently wide to allow relative movement of the associated plates.

13. The heat exchanger of claim 1 wherein, for each plate of the plurality of plates, the at least one passageway comprises:
   an inlet plenum extending from the at least one inlet port of the plate;
   an outlet plenum extending to the at least one outlet port of the plate; and
   a plurality of legs fluidically in parallel between the inlet plenum and the outlet plenum.

14. The heat exchanger of claim 13 wherein:
the inlet plenum is adjacent the trailing edge; and
the outlet plenum is adjacent the leading edge.

15. A gas turbine engine comprising:
   a fan, a compressor, a combustor, and a turbine;
   a core flowpath through the compressor, the combustor, and the turbine;
   a bleed flowpath branching from the core flowpath;
   a bypass flowpath bypassing the compressor, the combustor, and the turbine; and
   a heat exchanger for providing thermal energy transfer between a first flow along the bleed flowpath and a second flow along the a bypass flowpath, the heat exchanger comprising:

at least one plate bank comprising a plurality of plates, each plate having:
- a first face and a second face opposite the first face;
- a leading edge along the bypass flowpath and a trailing edge along the bypass flowpath;
- a proximal edge having at least one inlet port along the bleed flowpath and at least one outlet port along the bleed flowpath; and
- at least one passageway along the bleed flowpath;

an inlet manifold having at least one inlet port and at least one outlet port;

an outlet manifold having at least one outlet port and at least one inlet port, the first flowpath passing from the at least one inlet port of the inlet manifold, through the at least one passageway of each of the plurality of plates, and through the at least one outlet port of the outlet manifold; and means linking distal portions of the plates for providing frictional damping.

16. The gas turbine engine of claim 15 wherein the means comprises:
a plurality of connectors wherein each connector has a first portion secured to one of the adjacent plates and a second portion spanning a gap to the other said adjacent plate and frictionally engaged with the distal edge of said other adjacent plate.

17. The gas turbine engine of claim 15 wherein the means comprises:
a plurality of connectors wherein each connector is an L-sectioned member having a foot secured to one of the adjacent plates and a leg spanning a gap to the other said adjacent plate and frictionally engaged with the distal edge of said other adjacent plate.

18. The gas turbine engine of claim 15 wherein the means comprises:
the frictional damping is between a shroud and connectors between plates.

19. The gas turbine engine of claim 15 wherein:
for each said plate bank the means comprises for at least some of the plurality of plates, an extension protruding from the first face in proximity to the distal edge to make contact with an adjacent plate.

20. The gas turbine engine of claim 19 wherein:
the extension is in frictional contact with the adjacent plate.

21. The gas turbine engine of claim 15 wherein the means comprises:
a plurality of connectors wherein each connector has a first portion secured to one of the adjacent plates and a second portion spanning a gap to the other said adjacent plate.

* * * * *